US011113169B2

(12) United States Patent
Samuel et al.

(10) Patent No.: US 11,113,169 B2
(45) Date of Patent: Sep. 7, 2021

(54) AUTOMATIC CREATION OF BEST KNOWN CONFIGURATIONS

(71) Applicant: Dell Products L.P., Round Rock, TX (US)

(72) Inventors: Balasingh P. Samuel, Round Rock, TX (US); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 16/780,166

(22) Filed: Feb. 3, 2020

(65) Prior Publication Data
US 2021/0240589 A1 Aug. 5, 2021

(51) Int. Cl.
*G06F 9/44* (2018.01)
*G06F 11/30* (2006.01)
*G06F 8/65* (2018.01)
*G06F 11/34* (2006.01)

(52) U.S. Cl.
CPC ............ *G06F 11/3093* (2013.01); *G06F 8/65* (2013.01); *G06F 11/3065* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 2010/0071053 A1* | 3/2010 | Ansari | G08B 13/19656 726/12 |
| 2014/0259074 A1* | 9/2014 | Ansari | H04N 21/238 725/50 |
| 2016/0283200 A1* | 9/2016 | Standley | G06F 9/445 |
| 2018/0176326 A1* | 6/2018 | Shantharam | G06F 9/4451 |
| 2020/0110591 A1* | 4/2020 | Buczkowski | G06F 9/44505 |

\* cited by examiner

*Primary Examiner* — Qamrun Nahar
(74) *Attorney, Agent, or Firm* — Kirton McConkie; Brian Tucker

(57) ABSTRACT

Best known configurations can be automatically created for particular platforms. An update tool can be installed on end user devices and can include a health monitor engine that creates health reports for drivers and/or firmware installed on the corresponding end user device. The health reports generated on the end user devices can be provided to a best known configuration engine that can evaluate them to calculate a best known configuration for each platform. The best known configurations can then be distributed to the update tool on the end user devices to cause them to configure the end user devices to match the corresponding best known configuration.

20 Claims, 10 Drawing Sheets

AUTOMATIC CREATION OF BEST KNOWN CONFIGURATIONS

CROSS-REFERENCE TO RELATED APPLICATIONS

N/A

BACKGROUND

Whenever a new (or updated) driver is released, there will inevitably be a number of installation failures, compatibility issues and other unintended side effects when the driver is installed. These issues will in turn lead to support calls, rollbacks of the installations, demotions of the drivers and other manual tasks. This reactive approach is time consuming and expensive. For example, when a driver is released, customers may begin making support calls to report an installation failure or other issue that arose after the installation of the driver. During these support calls, support personnel may attempt to diagnose the source of the issue and correct it. Over time, the support personnel may identify the driver as the source and escalate the issue to management/engineering. After substantial review, management may determine that the driver should be blacklisted to prevent further installation of the driver.

BRIEF SUMMARY

The present invention extends to methods, systems, and computer program products for automatically creating best known configurations for particular platforms. An update tool can be installed on end user devices and can include a health monitor engine that creates health reports for drivers and/or firmware installed on the corresponding end user device. The health reports generated on the end user devices can be provided to a best known configuration engine that can evaluate them to calculate a best known configuration for each platform. The best known configurations can then be distributed to the update tool on the end user devices to cause them to configure the end user devices to match the corresponding best known configuration.

In some embodiments, the present invention is implemented as a method for automatically generating a best known configuration for a platform. A best known configuration engine can receive, from a first set of end user devices that have the platform, health reports pertaining to a first driver or firmware that is installed on the first set of end user devices. Each health report includes performance information of the first driver or firmware on the corresponding end user device. The best known configuration engine can then evaluate the performance information of the first driver or firmware that is included in the health reports. Based on the evaluation, the best known configuration engine can determine that the first driver or firmware is functioning properly on the first set of end user devices. Based on the determination, the best known configuration engine can include the first driver or firmware in the best known configuration for the platform. The best known configuration for the platform can then be published.

In some embodiments, the present invention is implemented as a support system for automatically generating a best known configuration for a platform. The system includes a plurality of end user devices having a platform. Each end user device includes an update tool having a health monitor engine that generates health reports for drivers or firmware installed on the end user device. Each health report includes performance information for the corresponding driver or firmware. The system also includes a best known configuration engine that receives the health reports from each of the plurality of end user devices and evaluates the performance information included in each health report to generate a best known configuration for the platform.

In some embodiments, the present invention is implemented as a method for automatically generating a best known configuration for a platform. An update tool can be executed on each of a plurality of end user devices. The update tool includes a health monitor engine that monitors drivers or firmware installed on the corresponding end user device and, based on the monitoring, generates health reports which define performance information for the drivers or firmware. A best known configuration engine receives the health reports generated on each of the plurality of end user devices and evaluates the performance information defined in the health reports to identify drivers or firmware that are functioning properly on the end user devices. Based on the evaluation, the best known configuration engine generates a best known configuration.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "driver" should be given its ordinary meaning such as software that enables the operating system to access hardware. The term "firmware" should also be given its ordinary meaning such as software that is installed on the hardware. The present invention can be implemented in the context of both drivers and firmware. However, to simplify the specification, the present invention will primarily be described in the context of drivers only. The term "configuration" should be construed as a collection of drivers (and typically firmware) that may be installed on an end user device. The term "platform" should be construed as encompassing the hardware and operating system of an end user device. The term "best known configuration" should be construed as a configuration that has been determined to be the best configuration for a particular platform, or in other words, a configuration that has been determined to be the best for end user devices having a particular combination of hardware and/or operating system.

The term "package" should be construed as a collection of one or more files that are delivered when a driver is installed. For example, in a Windows environment, a package (or "driver package") would typically include each driver file (e.g., one or more .sys files), each installation file (e.g., one or more INF files) and a catalog (.cat) file that represents the digital signature of the package. In the case of firmware, a package (or "firmware driver package") may include the payload for a firmware update that can be distributed to the hardware via the Unified Extensible Firmware Interface ("UEFI"). In some embodiments, a package may be in the form of an .exe file. The term "catalog" should be construed as metadata that defines a collection of packages that are intended for a particular end user device. For example, a catalog may be in the form of an .xml file that identifies characteristics of the targeted end user devices and lists all of the packages that are intended for the targeted end user devices. A best known configuration can therefore be defined using a catalog. In this terminology, the present invention can be viewed as providing a way to automatically create a catalog that defines the best known configuration for end user devices having the same platform and then distribute the catalog to end user devices to cause them to reach the best known configuration.

Figure 1:
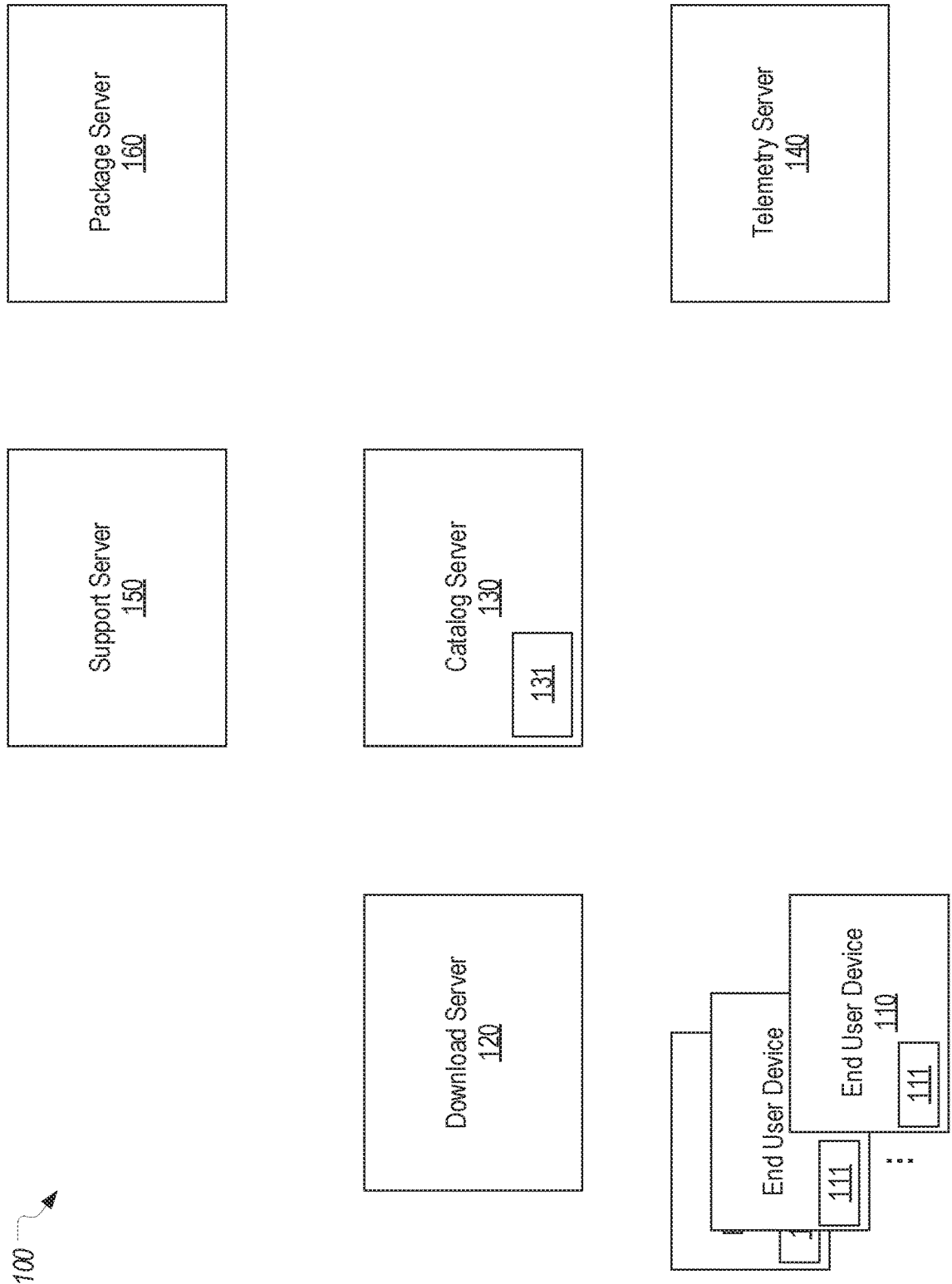
FIG. 1 illustrates an example computing environment in which the present invention can be implemented.

FIG. 1 illustrates an example computing environment 100 in which the present invention may be implemented. Computing environment 100 includes a number of end user devices 110, a download server 120, a catalog server 130, a telemetry server 140, a support server 150 and a package server 160. In this context, the term "server" should be construed as representing any suitable arrangement of hardware and/or software components that would enable the functionality described herein to be accomplished. The depiction of each server being separate is for illustrative purposes only. For example, in some embodiments, some or all of the depicted servers could be implemented within the same cloud architecture, whereas, in other embodiments, each depicted server could be implemented on a separate computing device. In short, the present invention should not be limited to any particular architecture but should encompass the described functionality that can be implemented in a wide variety of architectures.

End user devices 110 may typically represent desktops, laptops or other personal computing devices to which packages can be deployed to install/update drivers and/or firmware. In a common example, end user devices 110 could represent a group or all of a particular OEM's (e.g., Dell's or HP's) end user devices. As shown, an update tool 111 can be installed on end user devices 110. Update tool 111 can be configured to retrieve and install packages on end user device 110 as well as other functionality as described below.

Download server 120 can represent the components in computing environment 100 that enable update tool 111 to download (or otherwise retrieve) packages for installation on end user devices 110. As an example only, download server 120 could encompass the components that implement the downloads.dell.com website and corresponding back-end services. Catalog server 130 can represent the components in computing environment 100 that create and maintain catalogs. Catalog server 130 can also encompass a best known configuration engine 131 which can be configured to compute best known configurations as described below.

Telemetry server 140 can represent the components in computing environment 100 that receive telemetry data from update tool 111 and provide the telemetry data to best known configuration engine 131. Of relevance to the present invention, this telemetry data includes, but need not be limited to, driver health reports. Support server 150 can represent the components in computing environment 100 that implement end-user support services including presenting best known configurations to end users. As an example only, support server 150 could encompass the support.dell.com website and corresponding back-end services. Package server 160 can represent the components in computing environment 100 that store packages received from providers. As examples only, providers such as Dell, Intel, AMD, Realtek, Qualcomm, etc. may deliver packages to package server 160 so that the packages can be distributed to end user devices 110 via download server 120.

Figure 2:
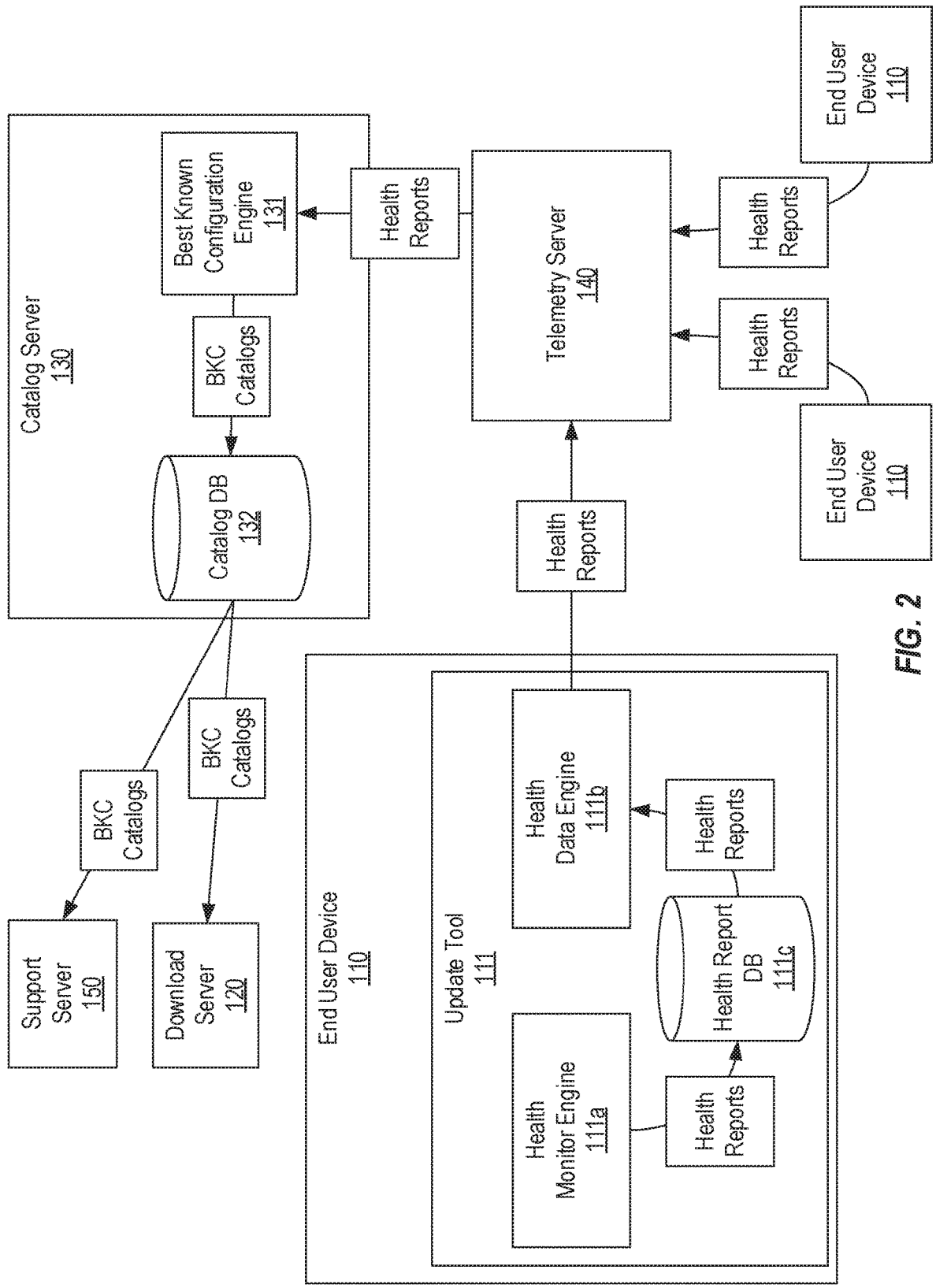
FIG. 2 provides an overview of how health reports can be generated on end user devices having a particular platform and employed by a best known configuration engine to calculate a best known configuration for the particular platform.

FIG. 2 illustrates that update tool 111 can include a health monitor engine 111a, a health data engine 111b and a health report database 111c. As described in greater detail below, health monitor engine 111a monitors drivers and/or firmware on end user device 110 to create and update health reports that it stores in health report database 111c. Health data engine 111b accesses health report database 111c to retrieve and upload the health reports to telemetry server 140. Telemetry server 140 can maintain these health reports and possibly other information about end user devices 110. Best known configuration engine 131 can retrieve the health reports from telemetry server 140 and use them to compute best known configurations. Best known configuration engine 131 may store the best known configurations as catalogs ("best known configuration catalogs") in catalog database 132 as well as publish them to download server 120 and support server 150. Catalog server 130 can interface with package server 160 to obtain information of packages (e.g., filenames) in creating a best known configuration catalog. Additionally, although not shown, to cause a particular end user device 110 to reach its best known configuration, update tool 111 can download (or otherwise retrieve) the best known configuration catalog for the particular end user device (e.g., the best known configuration catalog creating for the end user device's platform), compare it to the current configuration and then download and install any package (and/or uninstall any current driver/firmware), to cause the current configuration to match the best known configuration.

A health report can provide information about a particular driver or firmware that is installed on an end user device 110 and can associate the information with an identification of the platform (e.g., a serial number, product number, model number, service tag, etc.). The information about the driver or firmware may include at least some of the following: a date that the driver or firmware was installed, one or more identifiers of the driver or firmware, a category of the driver or firmware (e.g., the system-defined device setup class in Windows), a vendor/provider of the driver or firmware, a path to the corresponding package (e.g., the path to the .exe that was executed to install the driver or firmware), the total number of times the driver or firmware has crashed, the number of days that the driver or firmware has run without crashing, the total number of times the driver or firmware has stopped, the total number of times the driver or firmware has been repaired, and a link to a health report for a previous version of the driver or firmware.

Figure 3:
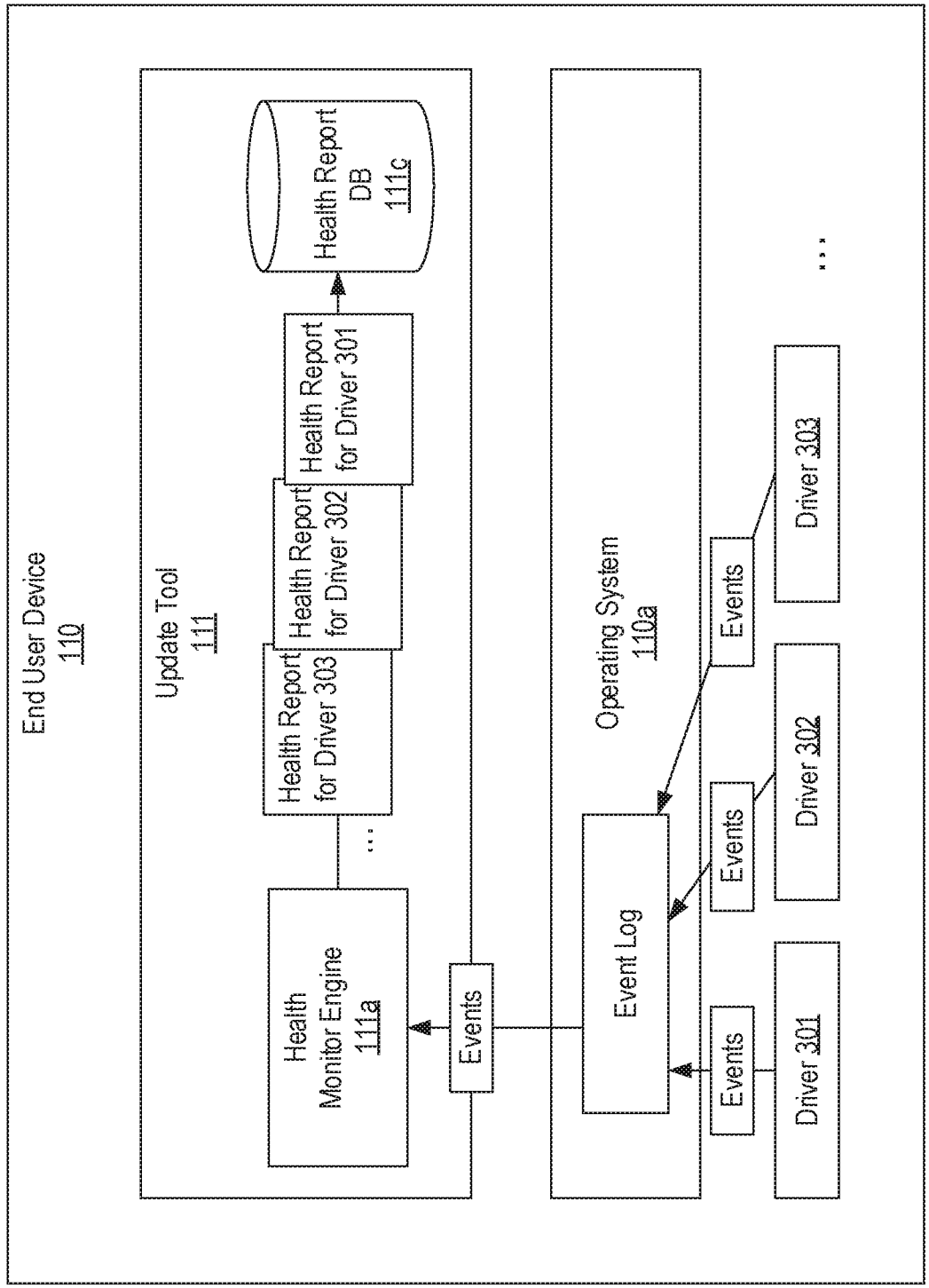
FIG. 3 provides an example of how a health monitor engine of an update tool can generate performance information for drivers and/or firmware installed on an end user device and include the performance information in health reports.

Health monitor engine 111a may compile much of this information when the driver or firmware is initially installed. However, to compile the information regarding the crashing, stopping and repairing of the driver or firmware (collectively "performance information"), health monitor engine 111a can be configured to monitor and detect such occurrences. FIG. 3 provides one example of how health monitor engine 111a may do so. In some embodiments, health monitor engine 111a can be configured to interface with the operating system 110a in order to read or otherwise receive events that drivers or firmware write to an event log. For example, in FIG. 3, end user device 110 is shown as having a number of drivers installed, including drivers 301-303, each of which is configured to write events to an event log when the driver stops, crashes, etc. (e.g., via an event handler). In a Windows environment, health monitor 111a could employ the NotifyChangeEventLog function to register to receive such events or the ReadEventLogA function to read such events from the event log. When it detects a stop, crash or repair event for a particular driver or firmware, health monitor engine 111a can update the performance information for that driver or firmware appropriately. The end result is that health monitor engine 111a will store a health report in health report database 111c for each driver or firmware that it monitors.

Figure 4:
FIG. 4 provides an example of health reports for different versions of the same driver including how the health reports can be linked.

FIG. 4 provides examples of health reports 401 and 402 that health monitor engine 111a may store in health report database 111c for a particular driver installed on end user device 110. For this example, it will be assumed that both reports 401 and 402 pertain to a display adapter driver with health report 402 representing the currently installed version of the driver and health report 401 representing the previously installed version of the driver. It can also be assumed that health monitor engine 111a previously created and maintained health report 401, and then created health report 402 when the current version of the display adapter driver was installed on Dec. 1, 2019. As part of creating health report 402, health report engine 111a created a link that points back to health report 401. It can further be assumed that health report engine 111a has detected that the current version of the display adapter driver has crashed three times, including on the current date, has stopped seven times and has been repaired once.

Health report engine 111a can create and maintain similar health report(s) for each driver or firmware installed on end user device 110 (or at least each driver or firmware that it is configured to monitor). In short, whenever a driver or firmware is updated/installed, health report engine 111a can create a health report for the current version of the driver or firmware, link it back to the health report for the previous version (if one exists), monitor the performance of the current version of the driver or firmware and update the health report's performance information based on the monitoring.

Figure 5:
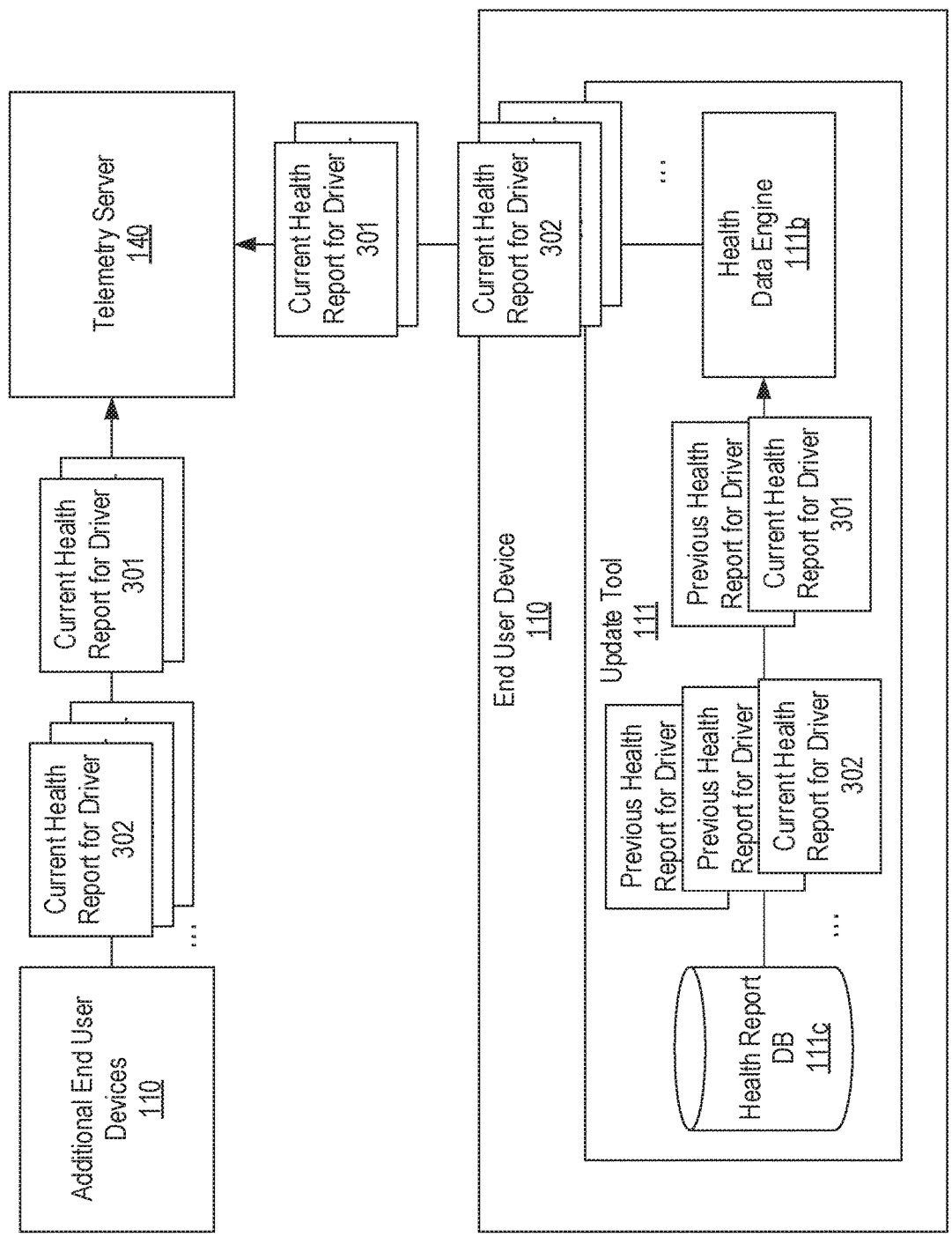
FIG. 5 provides an example of how a health data engine of the update tool can provide health reports to a telemetry server where they can be stored for subsequent access by the best known configuration engine.

As represented in FIG. 5, health data engine 111b can periodically retrieve the health reports for both current and previous versions of the drivers from health report database 111c and send them to telemetry server 140. Because each of end user devices 110 includes update tool 111, telemetry server 140 will receive health reports for the same drivers from many different end user devices 110. Telemetry server 140 may then store these health reports for subsequent access by best known configuration engine 131.

Best known configuration engine 131 can be configured to access the health reports stored by telemetry server 140 (e.g., periodically, in response to user input, after the release of an updated version of a driver, etc.) and evaluate them to determine whether a best known configuration should be updated. In some embodiments, when a new version of a driver or firmware is released for a particular platform, it may initially be distributed to a small subset of end user devices having the particular platform. Then, as the new version of the driver or firmware is executed on these end user devices, the health report engine 111a on these same devices will create and update health reports for the new version of the driver or firmware. These health reports, along with health reports for other drivers and/or firmware installed on the end user devices, will in turn be made available to best known configuration engine 131 which can evaluate them to determine whether the new version of the driver or firmware should be included in the best known configuration for that platform. In other words, in such embodiments, a newly released version of a driver or firmware may not be released to (or at least recommend for) all end user devices 110 having the same platform until after best known configuration engine 131 has determined that the newly released version should be included in the best known configuration for that platform. In this way, the present invention can minimize the impact that an improperly functioning, incompatible or otherwise faulty driver or firmware will have.

Figure 6A:
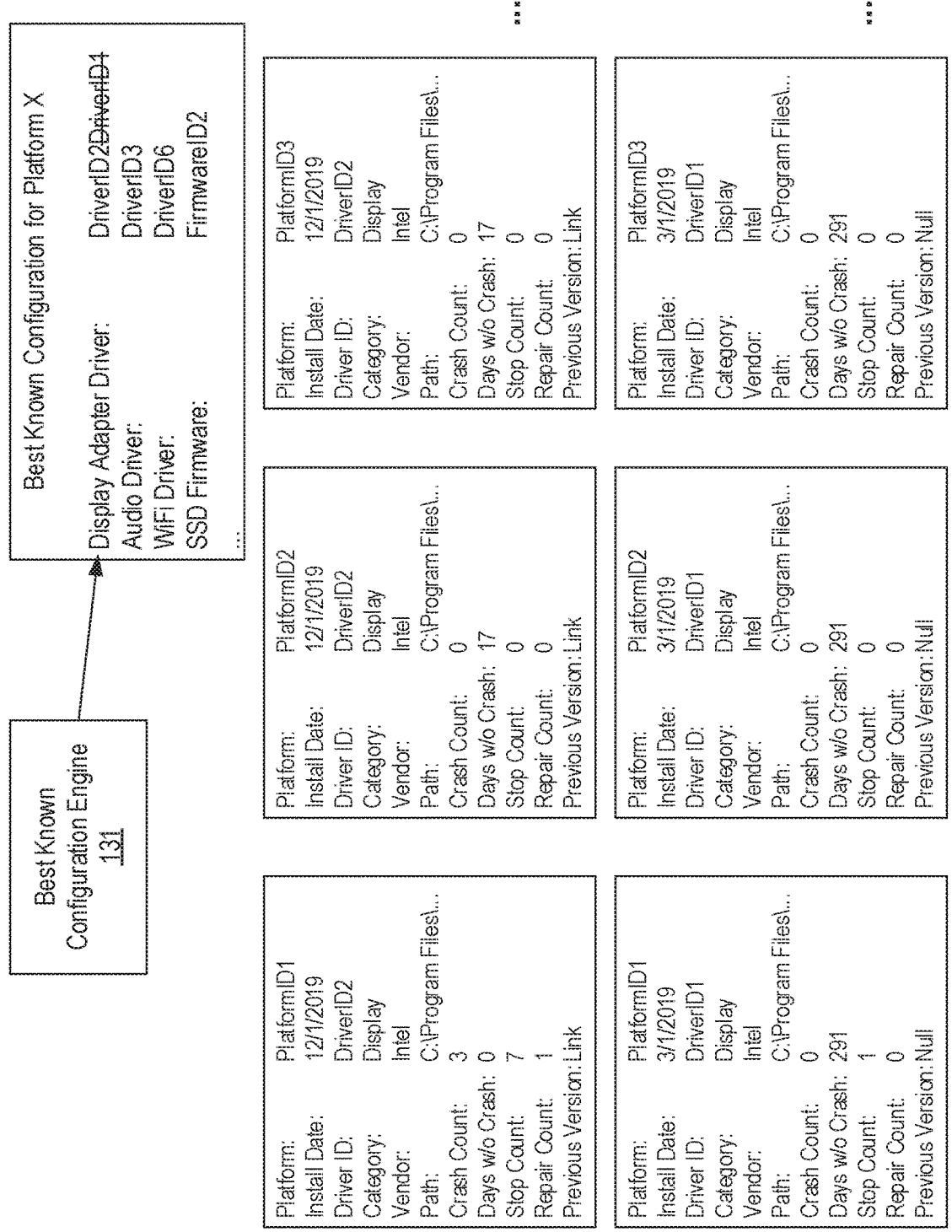
FIGS. 6A and 6B each provide an example of how the best known configuration can evaluate health reports to determine whether to update the best known configuration.
Figure 6B:
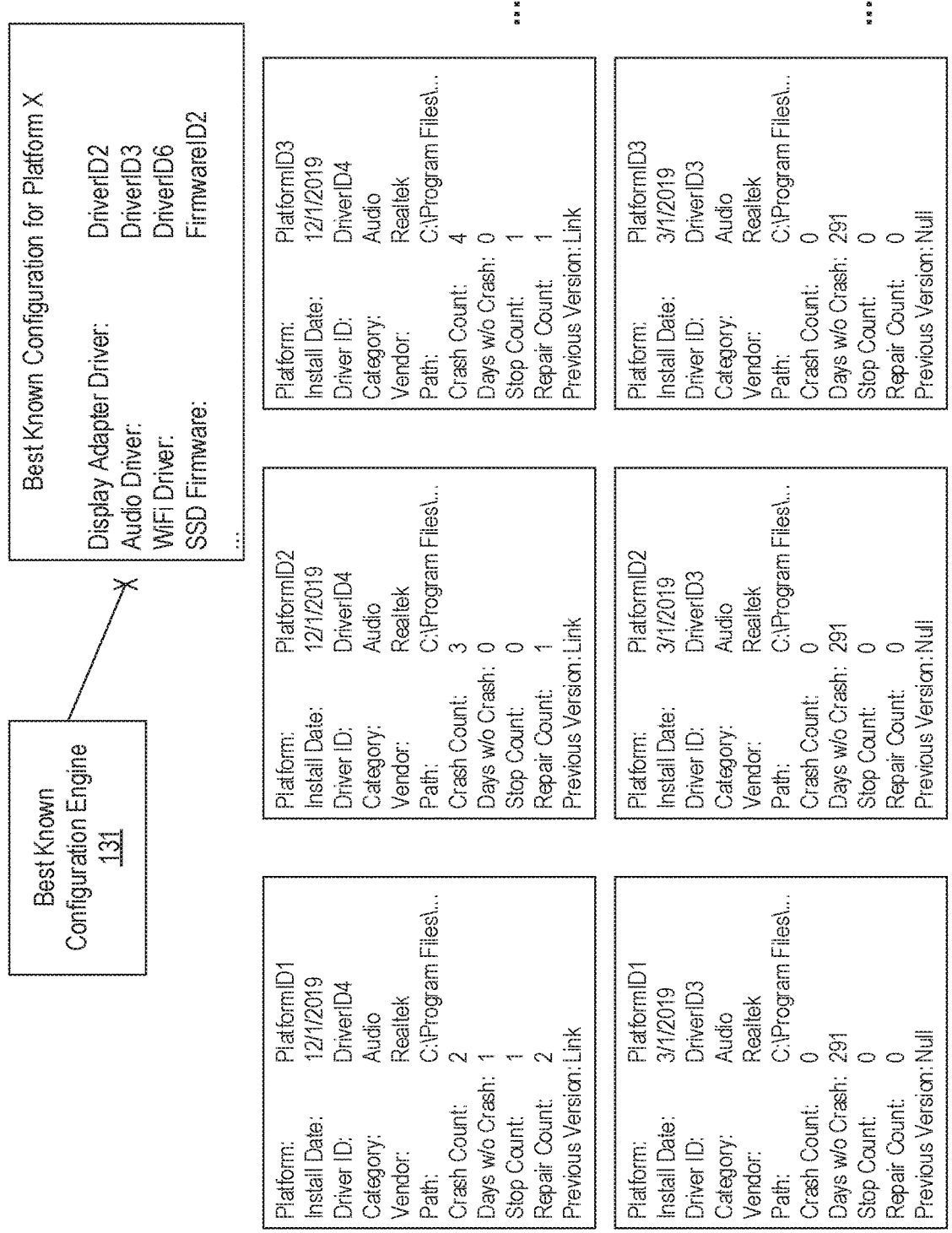

FIGS. 6A and 6B provide a simplified example of how best known configuration engine 131 can update the best known configuration for a platform, platform X, based on an evaluation of health reports received from end user devices 110 that have the same platform X. In these examples, it is assumed that best known configuration engine 131 had already calculated a best known configuration for platform X that included a display adapter driver (DriverID1) and an audio driver (DriverID3) among many others. It is also assumed that an updated version of the display adapter driver (DriverID2) and an updated version of the audio driver (DriverID4) have been provided to and installed on a subset of end user devices 110 having platform X (e.g., end user devices having platform IDs of PlatformID1, PlatformID2 and PlatformID3). The driver ID referenced in these examples may represent any identifier that either alone or in conjunction with other information uniquely identifies the version of the driver. Similarly, the platform ID references in these examples may represent any identifier of an end user device that alone or in conjunction with other information uniquely identifies the platform of the end user device.

In view of these assumptions, FIG. 6A illustrates examples of health reports for the display adapter driver that could have been received from the subset of end user devices 110. As mentioned above, best known configuration engine 131 could employ the platform identifier in each health report to locate health reports applicable to the best known configuration that is being evaluated. In particular, the same driver or firmware could have been installed on multiple subsets of end user devices 110 where each subset has a different platform. The platform identifier in the health reports enables best known configuration engine 131 to identify health reports pertaining to the same platform and to perform a per-platform determination of whether to include the newly released version of the driver or firmware in the platform's best known configuration.

In this example, one health report indicates that the newly released version of the display adapter driver has crashed three times, stopped seven times and been repaired one time. However, each of the other applicable health reports (which may be many in a typical implementation) indicate that the newly released version of the display adapter driver is functioning properly without any crashes, stops, or repairs. It can therefore be presumed that the crashes on the one end user device are not being caused by the driver itself, but by some other issue. Accordingly, based on an evaluation of these health reports, best known configuration engine 131 can determine that the newly released version of the display adapter driver is functioning properly across the vast majority of end user devices having platform X and therefore that this version of the driver should be included in the best known configuration for platform X. Accordingly, in FIG. 6A, best known configuration engine 131 is shown as modifying the best known configuration to identify the newly released version of the display adapter driver (DriverID2) rather than the previous version (DriverID1). As a result, when the best known configuration is distributed to update tool 111 on each of the end user devices 100 having platform X, it will cause update tool 111 to install the newly released version of the display adapter driver.

FIG. 6B represents a scenario where best known configuration engine 131 evaluates health reports pertaining to the updated version of the audio driver installed on the subset of end user devices 110 having platform X. In contrast to the example in FIG. 6A, the health reports shown in FIG. 6B indicate that the newly released version of the audio driver has crashed on each end user device 110, has stopped on a majority of the end user devices 110 and has been repaired on each end user device 110. Based on this evaluation, best known configuration engine 131 can determine that the newly released version of the audio driver is not functioning properly and therefore should not be included in the best known configuration. Accordingly, FIG. 6B represents that best known configuration engine 131 maintains the previous version of the audio driver (DriverID3) in the best known configuration rather than replacing it with the latest version of the audio driver (DriverID4). As a result, when the best known configuration is distributed to update tool 111 on each of the end user devices 100 having platform X, update tool 111 will not install the newly released version of the audio driver.

These are merely simple examples of how best known configuration engine 131 could evaluate health reports. In actual implementations, best known configuration engine 131 may employ a complex algorithm for calculating whether the combined performance information indicates that a particular driver or firmware is functioning at a level that would be considered optimal, or the best, for the particular platform. As an example, best known configuration engine 131 could compare performance information of the latest version of a driver or firmware to performance information of the previous version or versions of the driver or firmware. In such cases, if the latest version of the driver or firmware is performing better than earlier versions on the particular platform, best known configuration engine 131 may determine that the latest version should be included in the best known configuration even if it has crashed, stopped, been repaired, etc.

Each example to this point has assumed that best known configuration engine 131 determines the best version of a particular driver or firmware in isolation. However, in some embodiments, best known configuration engine 131 can be configured to identify the best combination of drivers/firmware/versions for the particular platform. For example, best known configuration engine 131 could determine that the latest version of the audio driver is frequently crashing but only when the latest version of the display adapter driver is not also installed. Accordingly, even though a relatively high number of health reports may indicate that the latest version of the audio driver is frequently crashing, best known configuration engine 131 can determine that the best known configuration should include the latest versions of the audio driver and the display adapter driver. In such cases, best known configuration engine 131 may also blacklist the previous version of the display adapter driver to prevent future crashes that may be due to an incompatibility with the latest version of the audio driver.

In the previous examples, best known configuration engine 131 has evaluated health reports generated by a subset of end user devices 110 to determine whether to include a newly released version of a driver or firmware in the best known configuration. However, best known configuration engine 131 can perform similar functionality at any time to determine whether the best known configuration should be updated. For example, if at any time, best known configuration engine 131's evaluation of the health reports identifies that a driver or firmware that is currently included in the best known configuration is no longer performing properly on a particular platform, the best known configuration for that platform can be updated appropriately. In such cases, to determine how to update the best known configuration, best known configuration engine 131 can use the links defined in the health reports to identify the latest working version of the driver or firmware.

As an example relative to FIG. 6A, if subsequent health reports for the updated version of the display adapter driver (DriverID2) reveal that the driver has commenced crashing on a significant number of end user devices 110, best known configuration engine 131 can use the links in the health reports to locate the latest working version of the display adapter driver. In this example, the linked-to health reports would indicate that the version of the display adapter driver having an ID of DriverID1 was the latest working version (e.g., that the earlier version did not frequently crash or at least crashed less frequently than the current version). Based on this determination, best known configuration engine 131 could update the best known configuration for platform X by replacing DriverID2 with DriverID1. As a result, when the best known configuration is distributed to update tool 111 on each of the end user devices 100 having platform X, update tool 111 will roll back the display adapter driver to the latest working version.

An exhaustive list of all the possible calculations best known configuration engine 131 may perform using the health reports cannot be given. Suffice it to say that best known configuration engine 131 can evaluate the health reports for all drivers and/or firmware installed on end user devices 110 having the same platform to determine which combination of drivers and/or firmware provides the best known configuration for that platform. By calculating the best known configuration from health reports, best known configuration engine 131 can proactively identify both the best combination of drivers and/or firmware and any problematic drivers and/or firmware with minimal human involvement. By publishing this best known configuration for consumption by update tool 111, best known configuration engine 131 can also ensure that the corresponding end user devices 110 will be updated to match the best known configuration, again with minimal human involvement. For example, update tool 111 could be configured to periodically and automatically query for the best known configuration for the platform of the end user device 110 on which it is running. Update tool 111 could then determine which drivers or firmware need to be installed and/or uninstalled to cause the end user device's configuration to match the best known configuration.

Figure 7:
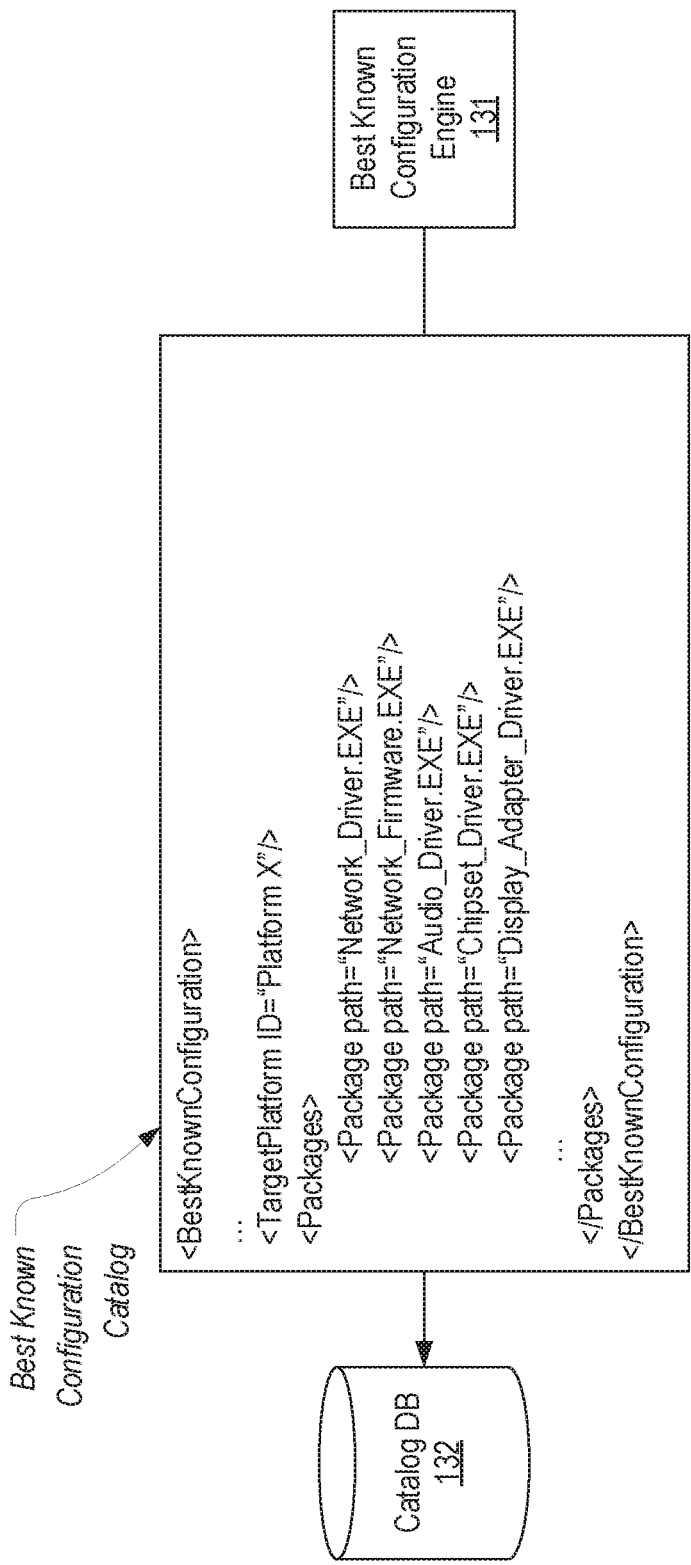
FIG. 7 provides an example of how the best known configuration engine may define and publish the best known configuration in the form of a best known configuration catalog.

FIG. 7 provides an example of how best known configuration engine 131 can publish a best known configuration in the form of a best known configuration catalog. As an example only, the depicted best known configuration catalog is in the form of an XML file that identifies the targeted platform (platform X) and lists each package that should be installed to cause the end user device 110 to match the best known configuration. Best known configuration engine 131 may interface with package server 160 to obtain information for generating these best known configuration catalogs (e.g., the file path to the executables for installing the drivers/firmware that make up the best known configuration).

As mentioned above, best known configuration engine 131 can calculate a best known configuration for each platform. In some embodiments, best known configuration engine 131 may even calculate multiple best known configurations for the same platform such as best known configurations for different types of workloads that may be performed on the same platform. To enable this in some embodiments, health monitor engine 111*a* may include workload information in the health reports. In any case, the best known configuration catalogs that best known configuration engine 131 generates can be stored in catalog database 132 where they will be accessible to download server 120 and/or support server 150 to thereby enable update tool 111 to access them.

Figure 8A:
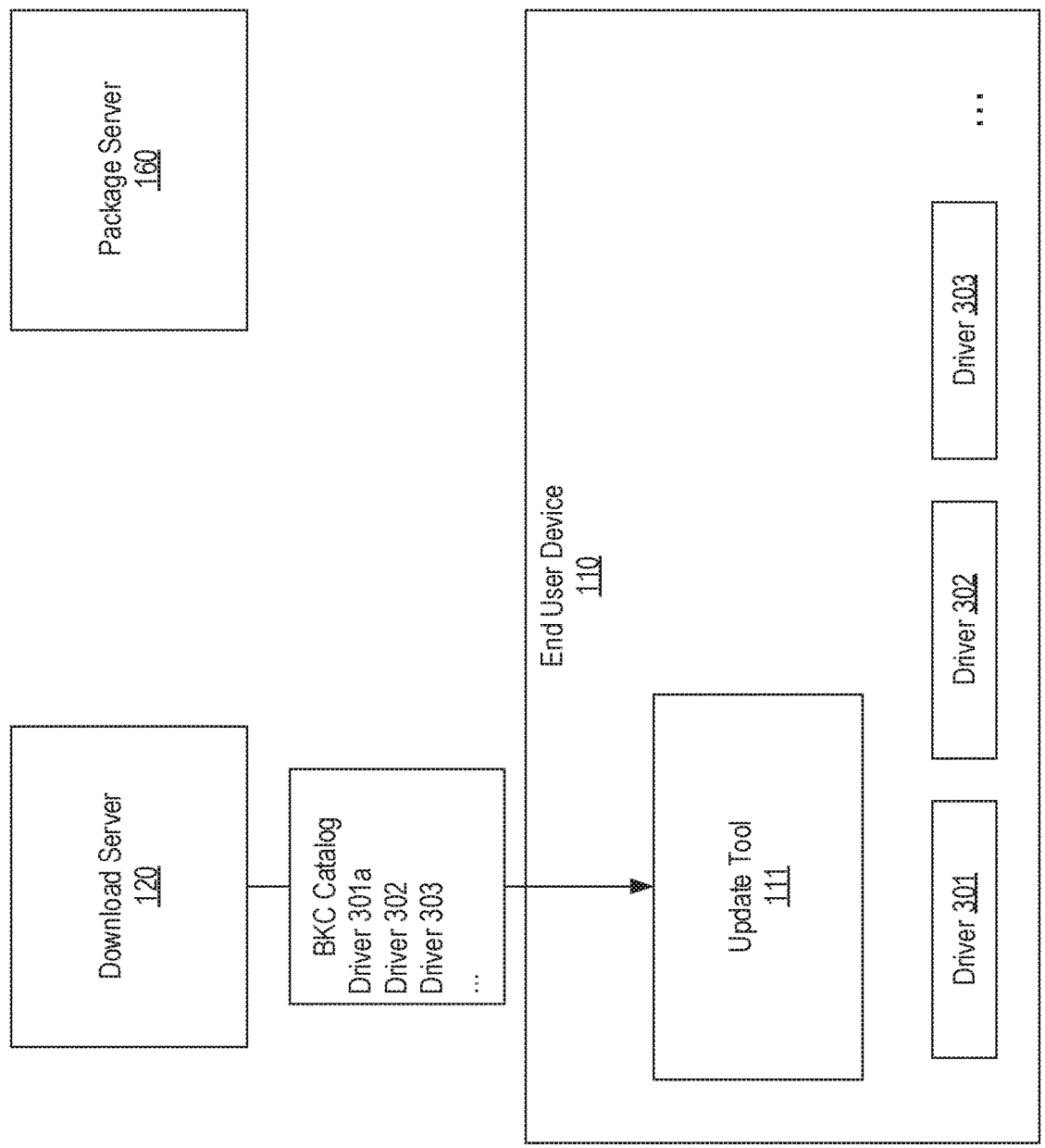
FIGS. 8A and 8B represent an example of how the update tool can employ a best known configuration catalog to automatically cause an end user device to match the best known configuration.
Figure 8B:
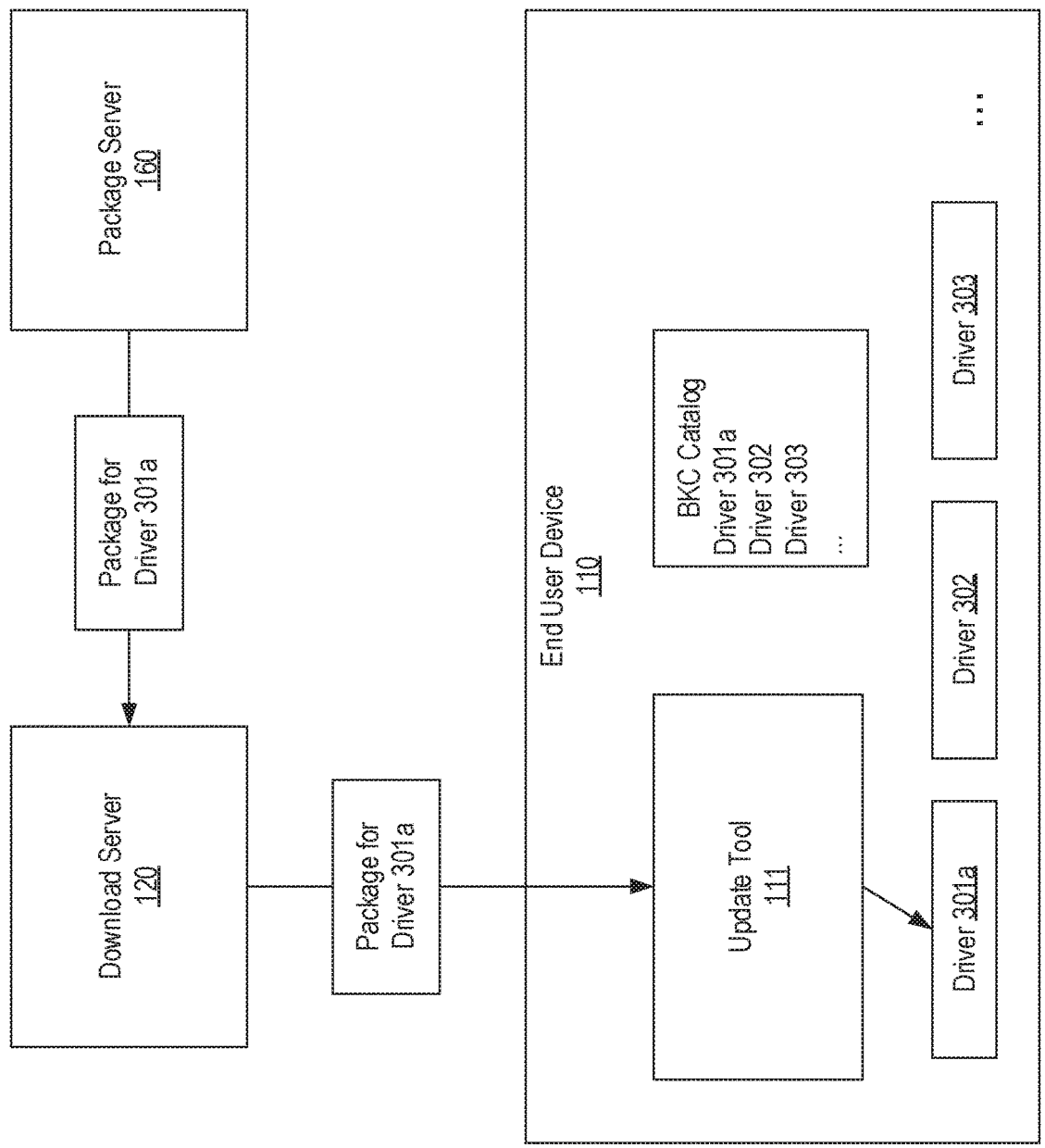

FIGS. 8A and 8B represent how update tool 111 on an end user device 110 can obtain a best known configuration catalog and employ it to cause the end user device 110 to match the best known configuration. In FIG. 8A, update tool 111 is shown as receiving a best known configuration catalog that pertains to the platform that end user device 110 has. For example, update tool 111 could be configured to periodically query download server 120 for the corresponding best known configuration catalog. Once it receives the best known configuration catalog, update tool 111 can evaluate it against the current configuration of the end user device. In this example, this evaluation will reveal that driver 301 is installed on end user device 100 but the best known configuration catalog defines driver 301*a*. As represented in FIG. 8B, update tool 111 can respond by requesting the package for driver 301*a* from download server 120 which may retrieve it from package server 160. Once it receives the package for driver 301*a*, update tool 111 can execute the package to cause driver 301*a* to be installed in place of driver 301 thereby causing the configuration of end user device 110 to match the best known configuration.

At this point, driver health monitor engine 111*a* would commence monitoring driver 301*a* (in addition to continuing its monitoring of the other installed drivers and firmware) including creating and updating a health report for driver 301*a*. With this process being performed on many different end user devices 110 having the same platform, best known configuration engine 131 will eventually have a substantial number of health reports pertaining to driver 301*a* and the other drivers and firmware in the best known configuration. If these health reports indicate that any changes should be made to the best known configuration, the process shown in FIGS. 8A-8B would be repeated. In essence, the present invention provides a feedback loop to ensure that the best known configuration is automatically identified and applied to the platform, or in other words, that the platform is automatically tuned based on the performance information in the health reports.

As can be seen, the present invention improves the functioning of end user devices by automatically identifying and applying the best known configuration to the end user devices. The present invention also improves support architectures by providing a way to automatically and repeatedly identify the best known configuration using performance information obtained from the end user devices on which the drivers are installed.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for automatically generating a best known configuration for a platform, the method comprising:
   receiving, by a best known configuration engine and from a first set of end user devices that have the platform, health reports pertaining to a first driver or firmware that is installed on the first set of end user devices, each health report including performance information of the first driver or firmware on the corresponding end user device;
   evaluating, by the best known configuration engine, the performance information of the first driver or firmware that is included in the health reports;
   based on the evaluation, determining that the first driver or firmware is functioning properly on the first set of end user devices;
   based on the determination, including the first driver or firmware in the best known configuration for the platform; and
   publishing the best known configuration for the platform.

2. The method of claim 1, wherein the performance information comprises one or more of:
   a number of times the first driver or firmware has crashed on the corresponding end user device;
   a number of times the first driver or firmware has stopped on the corresponding end user device; or
   a number of times the first driver or firmware has been repaired on the corresponding end user device.

3. The method of claim 1, wherein determining that the first driver or firmware is functioning properly on the first set of end user devices comprises determining that the performance information indicates that a number of times that the first driver or firmware has crashed is below a threshold.

4. The method of claim 3, wherein the threshold is defined relative to a number of times a previous version of the first driver or firmware crashed.

5. The method of claim 1, wherein including the first driver or firmware in the best known configuration for the platform comprises replacing a previous version of the first driver or firmware that was included in the best known configuration.

6. The method of claim 1, wherein publishing the best known configuration comprises providing the best known configuration for the platform to a second set of end user devices that have the platform.

7. The method of claim 1, further comprising:
   receiving, by the best known configuration engine and from the first set of end user devices that have the platform, additional health reports pertaining to a second driver or firmware that is installed on the first set of end user devices, each additional health report including performance information of the second driver or firmware on the corresponding end user device;
   evaluating, by the best known configuration engine, the performance information of the second driver or firmware that is included in the additional health reports;
   based on the evaluation, determining that the second driver or firmware is not functioning properly on the first set of end user devices;
   based on the determination, removing the second driver or firmware from the best known configuration for the platform; and
   publishing the best known configuration for the platform after the second driver or firmware has been removed.

8. The method of claim 7, wherein removing the second driver or firmware from the best known configuration for the platform comprises including a previous version of the second driver or firmware in the best known configuration for the platform.

9. The method of claim 8, further comprising:
   identifying the previous version of the second driver or firmware as a last working version of the second driver or firmware.

10. The method of claim 9, wherein identifying the previous version of the second driver or firmware as the last working version of the second driver or firmware comprises employing links in the additional health reports to identify health reports pertaining to the previous version of the second driver or firmware.

11. A support system comprising:
    a plurality of end user devices having a platform, each end user device including an update tool having a health monitor engine that generates health reports for drivers or firmware installed on the end user device, each health report including performance information for the corresponding driver or firmware; and
    a best known configuration engine that receives the health reports from each of the plurality of end user devices and evaluates the performance information included in each health report to generate a best known configuration for the platform.

12. The support system of claim 11, wherein evaluating the performance information comprises determining that a first driver or firmware installed on the plurality of end user devices is functioning properly, and wherein generating the best known configuration for the platform comprises including the first driver or firmware in the best known configuration.

13. The support system of claim 12, wherein including the first driver or firmware in the best known configuration comprises replacing a previous version of the first driver or firmware in the best known configuration.

14. The support system of claim 12, wherein evaluating the performance information comprises determining that a second driver or firmware installed on the plurality of end user devices is not functioning properly, and wherein generating the best known configuration for the platform comprises including a previous version of the second driver or firmware in the best known configuration.

15. The support system of claim 11, wherein generating the best known configuration for the platform comprises publishing a best known configuration catalog that defines the best known configuration by identifying each driver or firmware that should be installed on the end user devices to cause the end user devices to match the best known configuration.

16. A method comprising:
    executing, on each of a plurality of end user devices, an update tool that includes a health monitor engine that monitors drivers or firmware installed on the corresponding end user device and, based on the monitoring, generates health reports which define performance information for the drivers or firmware;
    receiving, by a best known configuration engine, the health reports generated on each of the plurality of end user devices;
    evaluating, by the best known configuration engine, the performance information defined in the health reports to identify which of the drivers or firmware are functioning properly on the plurality of end user devices; and based on the evaluation, generating, by the best known configuration engine, a best known configuration.

17. The method of claim 16, wherein the plurality of end user devices each have a first platform, and wherein the best known configuration pertains to the first platform.

18. The method of claim 16, wherein the plurality of end user devices include end user devices having a first platform and end user devices having a second platform, and wherein generating a best known configuration comprises generating a first best known configuration for the first platform and a second best known configuration for the second platform.

19. The method of claim 18, wherein the first best known configuration is generated based on an evaluation of performance information defined in health reports received from end user devices having the first platform and the second best known configuration is generated based on an evaluation of performance information defined in health reports received from end user devices having the second platform.

20. The method of claim 16, further comprising:
receiving, by the update tool on at least one of the plurality of end user devices, the best known configuration;
determining, by the update tool on each of the at least one of the plurality of end user devices, that a configuration of the end user device does not match the best known configuration, and in response, employing the best known configuration to install one or more drivers or firmware to cause the end user device to match the best known configuration.

* * * * *